United States Patent [19]

Beckey

[11] Patent Number: 4,674,027
[45] Date of Patent: Jun. 16, 1987

[54] THERMOSTAT MEANS ADAPTIVELY CONTROLLING THE AMOUNT OF OVERSHOOT OR UNDERSHOOT OF SPACE TEMPERATURE

[75] Inventor: Thomas J. Beckey, Edina, Minn.

[73] Assignee: Honeywell Inc., Minneapolis, Minn.

[21] Appl. No.: 746,474

[22] Filed: Jun. 19, 1985

[51] Int. Cl.$^4$ ............................................. G05D 23/00
[52] U.S. Cl. ..................................... 364/143; 364/557; 364/154; 364/155; 364/161; 236/46 R; 165/12
[58] Field of Search ............... 364/143, 153, 154, 155, 364/557, 161, 162; 318/609, 610; 236/46 R, 46 F, 15 BG, 78 D; 165/12

[56] References Cited

U.S. PATENT DOCUMENTS

| | | | |
|---|---|---|---|
| 4,096,562 | 6/1978 | Linz | 364/153 |
| 4,163,279 | 7/1979 | Kubota | 364/153 |
| 4,332,352 | 7/1982 | Jaeger | 236/46 R |
| 4,337,388 | 6/1982 | July | 236/46 F |
| 4,344,128 | 8/1982 | Frye | 364/153 |
| 4,356,962 | 11/1982 | Levine | 236/46 F |
| 4,366,534 | 12/1982 | Kompelein | 364/557 |
| 4,373,664 | 2/1983 | Barker et al. | 236/46 R |
| 4,386,649 | 6/1983 | Hines et al. | 364/557 |
| 4,387,763 | 6/1983 | Benton | 318/609 |
| 4,390,959 | 6/1983 | Cabou | 364/557 |
| 4,436,064 | 3/1984 | Lamkewitz et al. | 236/46 R |
| 4,475,685 | 10/1984 | Grimado et al. | 364/557 |
| 4,520,301 | 5/1985 | Suzuki | 364/161 |

Primary Examiner—Joseph Ruggiero
Assistant Examiner—John R. Lastova
Attorney, Agent, or Firm—Alfred N. Feldman

[57] ABSTRACT

A microcomputer based clock operated thermostat is operated to adjust a ramprate of a setpoint temperature upon a setpoint change. The microcomputer in the thermostat is capable of determining the amount of overshoot or undershoot between the air temperature and the desired setpoint temperature by utilizing a sensor temperature of the thermostat, and computing a variation in the pickup ramprate to bring the overshoot within an acceptable level.

9 Claims, 8 Drawing Figures $$\text{RAMPRATE}_{NEW} = \text{RAMPRATE}_{OLD} + [0.5 - (T_{MAX} - T_{SETPNT})] (2.0)$$

LIMIT THE CHANGE FOR EACH ITERATION TO BE LESS THAN OR EQUAL TO 1.0° F/HR.

SO IF $[0.5 - (T_{MAX} - T_{SETPNT})] (2.0) > 1.0$, THEN USE 1.0.

RAMPRATE$_{NEW}$ = RAMPRATE$_{OLD}$ + [0.5 - (T$_{MAX}$ - T$_{SETPNT}$)] (2.0)

LIMIT THE CHANGE FOR EACH ITERATION TO BE LESS THAN OR EQUAL TO 1.0° F/HR.

SO IF [0.5 - (T$_{MAX}$ - T$_{SETPNT}$)] (2.0) > 1.0, THEN USE 1.0.

THERMOSTAT MEANS ADAPTIVELY CONTROLLING THE AMOUNT OF OVERSHOOT OR UNDERSHOOT OF SPACE TEMPERATURE

CROSS REFERENCE TO RELATED APPLICATION

The present application relates to an application entitled Adaptive Clock Thermostat Means For Controlling Over and Undershoot, Ser. No. 745,462, filed on June 17, 1985, by the same inventor and assigned to the assignee of the present application.

BACKGROUND OF THE INVENTION

Mass produced clock operated thermostats are normally installed in a variety of different types of heating and cooling applications. The same basic thermostat may be used for control of a forced air heating and cooling system, all electric systems, normal hydronic systems, and oversized hydronic systems. Also, utilized in this area are multistaged heat pump devices that utilize the multiple stages for heating and cooling, sometimes combined with auxiliary heat. Each of these types of installations have entirely different characteristics in response to a normal setup, or setback, that is accomplished for energy savings by a clock thermostat.

While attempts have been made to provide adjustments in the cycling rate of a thermostat for a particular type of heating plant, this type of accommodation normally will not provide good comfort control when the thermostat calls for sudden setup or setback temperature that has been programmed into the thermostat. These major changes in the setpoint of the thermostat can cause significant overshoot problems in both single stage and multistage type environments. The patent application referred to in the above cross-reference is particularly adapted for solution of this problem in single stage type installations.

Typically, a substantial morning pickup is provided by clock operated thermostats. The space temperature is normally controlled at a relatively low temperature during the night to save energy. In the morning, a setup occurs in order to move the space temperature from the lower energy saving level to a desired higher comfort level. This typically locks the heating plant into a full "on" state and the space temperature rises at a rate that is a function of the particular parameters of the heating plant and the environment in which it is used. This arrangement causes a substantial overshoot of the space temperature compared to the setpont temperature that is being called for by the clock thermostat. Ordinarily, in a hour or two. this overshoot corrects itself, but this is an undesirable result of the sudden setpoint change that occurs when pickup is programmed into this type of a thermostat.

SUMMARRY OF THE INVENTION

With the advent of microcomputer based type thermostats, it is possible to provide operating programs that utilize the clock within the device and the memory that accompanies the microcomputer to implement various types of control programs. The clock means, the microcomputer means, and the memory means allow a microcomputer based thermostat to measure existing performance, store information about the performance, and to compute new operating parameters for the thermostat.

Where microcomputer based thermostats are used for night setback and morning setup, large setpoint changes are automatically made to try and provide a compromise between an energy saving function of the lower operating temperature at night (for a heating situation), and ultimately bringing the temperature back to a comfortable daytime temperature. The large setup that occurs typically causes the heating plant to in turn force the air temperature or sensor temperature to badly overshoot the temperature setpoint that is desired. In single plant type systems, such as a forced warm air furnace, electric heat, or hydronic heat, the technique disclosed in the cross-referenced application wherein the gain of the thermostat is altered can be utilized. In multiplant type installations, such as multistaged heat pumps, this type of gain change can cause significant problems. The present invention overcomes that arrangement by making a change in the thermostat operation without altering the gain of the thermostat.

In the present invention the setpoint temperature ramprate slope is adjusted to compensate for a sudden change in setpoint temperature. In considering a heating type installation, if the setpoint is changed from 60 degrees to 70 degrees Fahrenheit, it is quite obvious that the heating plant will operate at its maximum initially. As the air temperature rises, the air temperature significantly overshoots the 70 degree desired temperature before the sensor can react. If that overshoot is measured, and is properly adjusted for at the next setup of the thermostat, the overshoot can be reduced. The type of operation that is performed by the present device is one in which the ramprate slope of the setpoint is changed, if necessary, so that the setpoint of the thermostat means is increased at a gradual rate rather than in a step function between the 60 degree and 70 degree Fahrenheit temperatures. When the change is made on the next cycle, the amount of overshoot again can be measured. If the overshoot is beyond a predetermined value, normally one-half of a degree Fahrenheit of the desired setpoint temperature, the slope of the ramprate can be further altered. This can occur successively in operation of the thermostat means until the overshoot is kept within an acceptable level. With the microcomputer, clock, and memory, the microcomputer type thermostat that is disclosed in the present application can readily make the adjustments to bring overshoot or undershoot conditions under control.

In accordance with the present invention there is provided clock thermostat means adaptively controlling the amount of overshoot or undershoot of space temperature due to changes in the current temperature setpoint of said thermostat means, including: microcomputer means including real time clock means and memory means; data input means connected to said microcomputer means to input a sequence of desired heat and cool control temperature setpoints and times for a desired temperature control by said thermostat means; temperature sensor means including connection means to monitor temperature at said thermostat means; said connection means connected to said microcomputer means to communicate a temperature at said sensor means to said microcomputer means; said thermostat means further including output switch means adapted to control heating and cooling equipment by said thermostat means; said microcomputer means and said memory means including overshoot-undershoot correction program means which is memory means providing a ramprate slope that reduces and overshoot-undershoot of said space temperature due operable to adjust a ramprate slope of a current temperature setpoint of said thermostat means; said overshoot-undershoot correction program means and said memory means providing a ramprate slope that reduces an overshoot-undershoot of said space temperature due to a change in said current temperature setpoint; and said overshoot-undershoot correction program means and said memory means creating a new ramprate slope after a temperature setpoint change to progressively adjust said ramprate slope of said thermostat to limit the amount of overshoot or undershoot of said space temperature to an acceptable level.

DESCRIPTION OF THE PREFERRED EMBODIMENT

Figure 1:
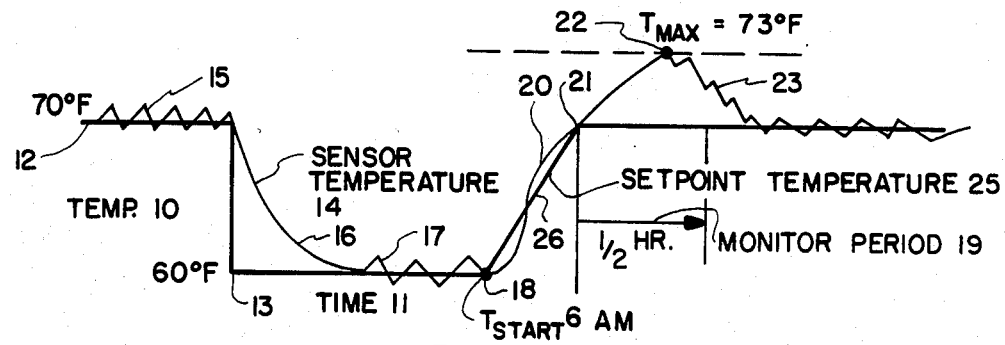
FIG. 1 is a graph of time and temperature showing the inventive concept.

In FIG. 1 the theory of operation of the present invention is explained with reference to a time and temperature graph. Temperature 10 is plotted against time 11 for a typical morning pickup heating cycle of a clock operated thermostat, that could be of a type disclosed in FIG. 2. A normal daytime temperature of 70 degrees Fahrenheit is shown at 12 which is reduced at time 13 to 60 degrees Fahrenheit in order to save energy at night. The time at 13 typically could be about 10 or 11 o'clock at night.

A sensor temperature 14 is disclosed which cycles at 15 around the 70 degree Fahrenheit temperature. At time 13, the sensor temperature 14 drifts as shown at 16 until it reaches the lower 60 degree Fahrenheit temperature at sometime during the night. The sensor temperature then cycles at 17. At a start time $T_{START}$ or 18, the clock thermostat means of the system initiates a morning pickup. The morning pickup increases the sensor temperature 14 as shown at 20 to intersect at 21 a desired 70 degree temperature for daytime operation. In the example disclosed, the desired daytime temperature of 70 degrees Fahrenheit occurs at 6 o'clock in the morning. Inherent in this type of an operation is an overshoot reaching a maximum 22 or a $T_{MAX}$ which can be considered as 73 degrees Fahrenheit. The temperature then drops off in a cycling manner at 23 until it reaches the 70 degree Fahrenheit temperature at some later time in the morning.

The setpoint temperature to which the sensor temperature 14 has been attempting to adhere, is shown as being ramped up or sloped at 26. A monitor period 19 of approximately one-half hour is measured from the point 21 upon which the recovery is based. With the ramped setpoint temperature 25 the temperature of the sensor did reach 70 degrees Fahrenheit at point 21 but overshot to the temperature of 73 degrees Fahrenheit at 22.

It has been found that by storing this information in the memory of a microcomputer operated clock thermostat that the information obtained can be operated upon by a program means within the thermostat means to reduce the overshoot or undershoot to an acceptable level. An acceptable level typically is considered to be no more than a one-half of one degree Fahrenheit overshoot or undershoot from the elected setpoint, in this case 70 degrees Fahrenheit.

It has been determined that the ramprate can be adjusted to a new ramprate by the microcomputer based thermostat so that the new ramprate is equal to the old ramprate plus a predetermined constant (disclosed as 2.0) times one-half degree Fahrenheit less the difference in $T_{Max}$ and $T_{Setpoint}$. With this program being implemented, the new ramprate is caused to be less sloped thereby bringing the actual sensor temperature and the setpoint temperatures into closer agreement. Eventually, through a series of these steps, the sensor temperature can be brought to the desired setpoint temperature without exceeding the one-half of one degree Fahrenheit limitation. This will be brought out in detail in connection with FIGS. 3 through 6 which disclose the operation of a thermostat controlled system through four successive days of operation. Before that operation is discussed, the design of a microprocessor controlled thermostat means will be disclosed in detail in FIG. 2.

Figure 2:
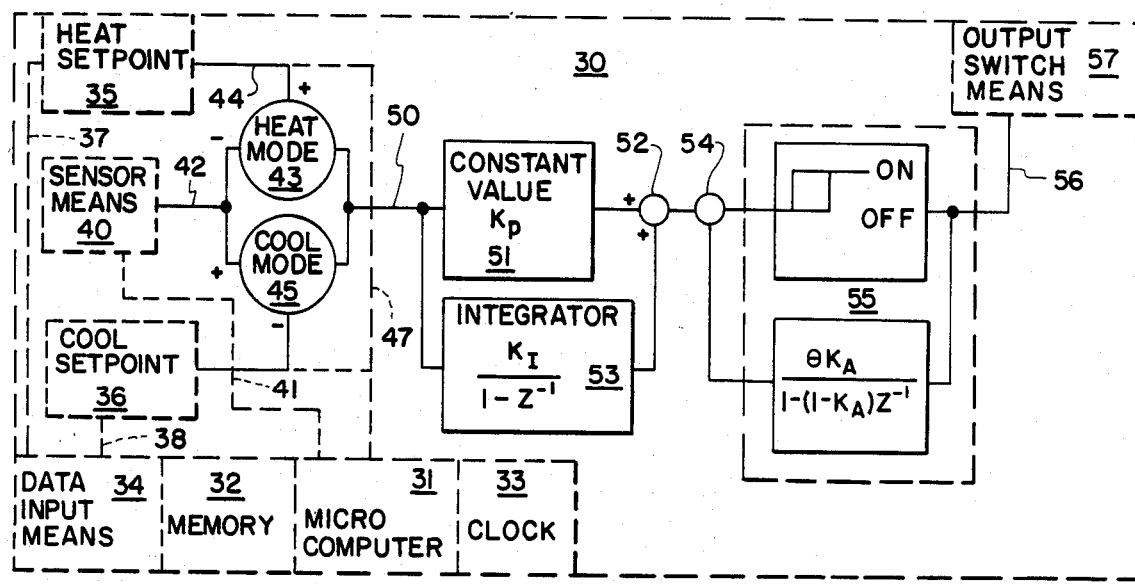
FIG. 2 is a block diagram of a microcomputer based thermostat.

A clock operated thermostat means 30 is disclosed in FIG. 2. The thermostat means 30 includes a microcomputer 31, its memory 32, and a clock means 33. Also included with the microcomputer means 31 is a data input means 34 which could be a keyboard arrangement or some other means for providing various settings. The thermostat means 30 further includes a heat setpoint means 35 and a cool setpoint means 36 that are connected at 37 and 38 to the data input means 34. The data input means 34 is capable of setting a heating and cooling setpoints for the thermostat means 30.

The thermostat means 30 further senses the room or air temperature by a sensor means 40 that could be a thermistor or other type of heat responsive means. The sensor means 40 supplies information via a channel 41 to the microcomputer means 31, and also supplies a signal on a conductor 42 to two summing arrangements. A heat summing mode or arrangement 43 is connected at 44 to the heat setpoint means 35 while a cooling summing mode 45 is connected by a conductor 46 to cooling setpoint means 36. Both the heat setpoint means 35 and the cool setpoint means 36 are connected by means 47 to allow the microcomputer means 31 to adjust the heating setpoint 35 or the cooling setpoint 36 to ramp the setpoint temperatures as determined by the microcomputer means 31. This provides for the ramping of the setpoints to adjust to minimize the overshoot or undershoot as was described in connection with FIG. 1.

The summing nodes 43 and 45 are in turn connected through a conductor 50 to a constant value circuit 51 that is summed at 52 in parallel with an integrator means 53. This forms part of a conventional electronic type of thermostat. The summing means 52 is connected to a further summing means 54 that is connected to a cycler 55 of conventional design. The cycler causes the thermostat to cycle at about six cycles per hour which has been found to be necessary to provide good temperature control. This cycling means 55 has an output at 56 to a switch means 57 which in turn can be any type of output switch, such as a relay or solid state switches, to control heating and cooling equipment that is adapted to be controlled by the thermostat means 30.

The operation of the thermostat means 30 can easily be understood in connection with the disclosure of FIG. 1. The thermostat means 30 initiates a first setback cycle and then setup cycle in a conventional manner. The amount of overshoot 22 of FIG. 1 is recorded by the microcomputer 31 and the memory 32, and a computation is made as is disclosed in connection with FIG. 1 as to a proper ramrate change. The microcomputer 31 then provides via the channel 47 an appropriate ramprate change to either the heat setpoint means 35 or the cool setpoint means 36 depending on whether a heating or cooling cycle is involved. A subsequent setpoint is executed by the thermostat means 30, and a new ramprate is again computed until the computation brings the overshoot 22 to a point where it no longer exceeds one-half of one degree Fahrenheit in temperature above (in the case of heating) or below (in the case of cooling) of the actual setpoint temperature for the desired comfort range.

In FIGS. 3 through 6 a series of four days of operation are disclosed to show the effect of the ramprate change on the operation of a typical building during a heating night setback and morning pickup arrangement. Each of the graphs of FIGS. 3 and 6 have two setback and setup cycles during a 24 hour period. The graphs of FIGS. 3 through 6 also include a function known as optimum start. Optimum start is a well known arrangement in which the starting time for a morning pickup is initiated earlier and earlier as the weather outside the building becomes colder and colder. This can be accomplished by measuring the outdoor temperature with a sensor and adjusting the starting time, or can be incorporated directly in the solid state thermostat means 30 by sampling the rate of change of temperature during the night when the heating plant has operated and projecting when it would be necessary to start the heating plant in order to reach the desired setpoint at an elected time. Since that feature is known and is not part of the present invention, no detailed explanation of that part of the graphs of FIGS. 3 through 6 will be included in the following discussion.

Figure 3:
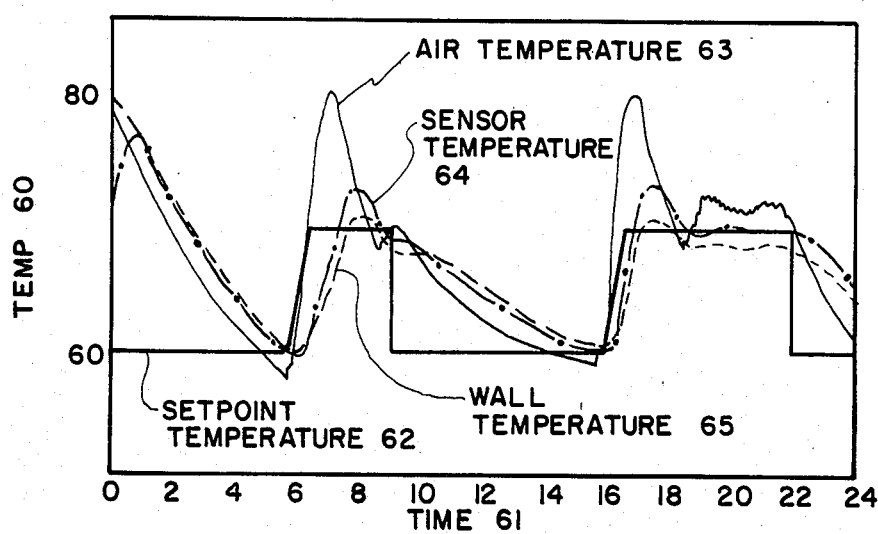
FIGS. 3 through 6 are progressive time and temperature graphs for four days.
Figure 4:
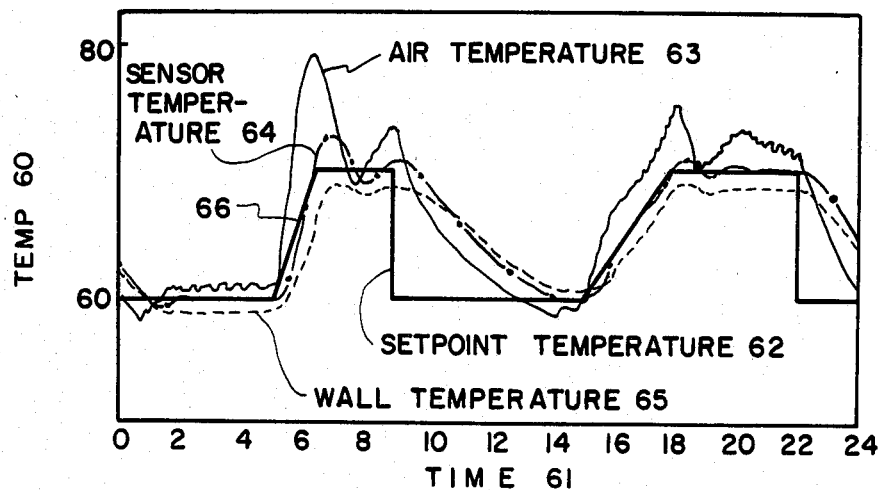

In FIG. 3 the temperature 60 is plotted against a 24 hour cycle of time 61. The desired setpoint temperature as preprogrammed into the thermostat means 30 is disclosed at 62, and starts at the zero point (or midnight) at 60 degrees Fahrenheit. At approximately 6 o'clock in the morning the setpoint temperature is raised to 70 degrees Fahrenheit. When this occurs, the heating plant locks itself on maximum operation and if it has multiple stages, typically all of the stages will come "on" to satisfy the need to raise the temperature from 60 degrees Fahrenheit to 70 degrees Fahrenheit. This maximum input of heat to the building causes the air temperature 63 to rise sharply and overshoots the setpoint temperature by approximately 10 degrees. The air temperature 63 has less enertia than the temperature at a sensor 64 or a wall temperature 65. The sensor temperature overshoots the setpoint temperature 64 by more than the wall temperature 65.

At about 9 o'clock in the morning the temperature is set back for a daytime setback energy savings at which time the air temperature 63, the sensor temperature 64 and the wall temperature 65 all tend to drift down towards the lower setpoint temperature 62. At about 4 o'clock in the afternoon the setpoint temperature 62 is once again raised and the overall overshoot problems reoccur.

Figure 5:
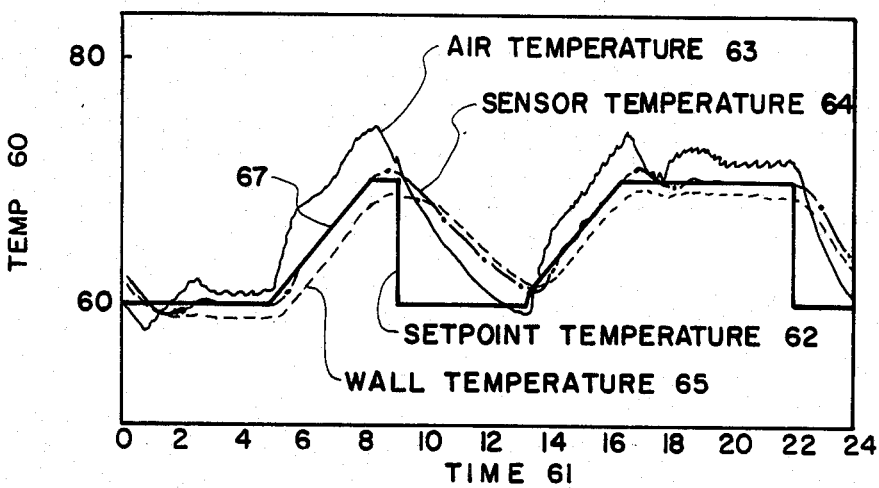

In the present invention this information is accumulated in the microcomputer 31 and the memory 32 along with the clock means 33 and a new ramprate is computed for the setpoint temperature 62. This new ramprate is less steep than the original ramprate as can be seen at 66 of FIG. 4. The less steep ramprate of the setpoint temperature 62 causes the overshoot of the air temperature 63 to be less severe and the sensor temperature and wall temperature become more closely aligned to the setpoint temperature 62. This information is again accumulated by the microcomputer means 31, the memory means 32 and the clock means 33, and a new computation is run for the third day which is disclosed in FIG. 5. In FIG. 5, the third day discloses a ramprate 67 that is less sloped than the ramprate of the previous days of FIGS. 3 and 4. In this particular example the air temperature has now dropped to an overshoot of a few degrees, and the air temperature 63, and the wall temperature 65 tend to follow the ramprate in a much closer fashion. It will be noted that in the afternoon pickup that the setpoint temperature 62, the air temperature 63, the sensor temperature 64, and the wall temperature 65 all tend to fall closer together, and are being brought within the criteria of the one-half of one degree Fahrenheit overshoot as the maximum allowable overshoot.

Figure 6:
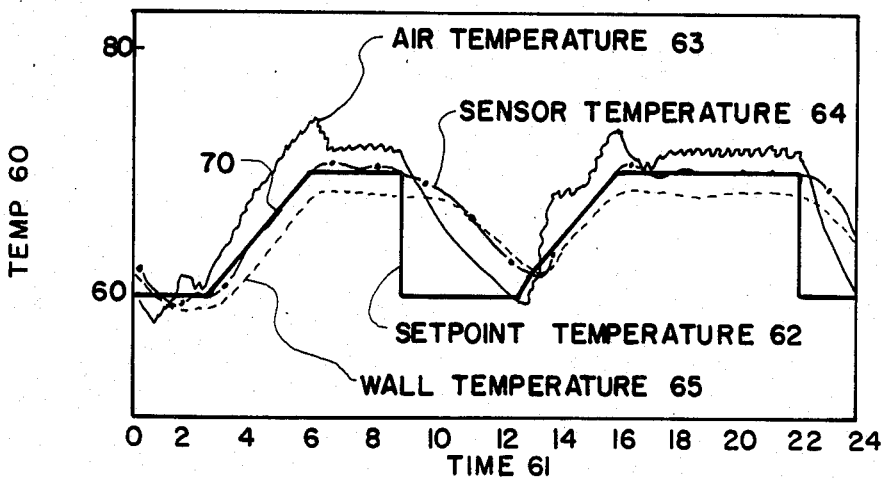

In FIG. 6, the ramprate 70 has been made even more shallow. In this particular case it is noted that the ramp starts at an earlier time of day, and this is the effect of the optimum start feature that is included in the thermostat, but not part of the present invention. It will be noted that the ramprate at 70 allows for a more gradual pickup of the air temperature 63 and the sensor temperature 64 very closely approximates the setpoint temperature that has been programmed into the system. Once the system begins to operate at the desired level, it continues to store information in the memory 32 and operates with the microcomputer means 31 and clock means 33. If any setpoint changes or changes in the environment occur, the thermostat can adapt itself by adjusting the ramprate to provide a maximum overshoot of one-half of one degree Fahrenheit on a continuing basis.

Figure 7:
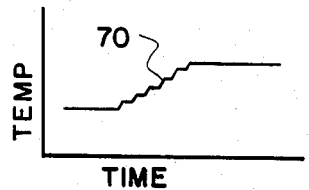
FIGS. 7 and 8 show modified setpoint slopes.
Figure 8:
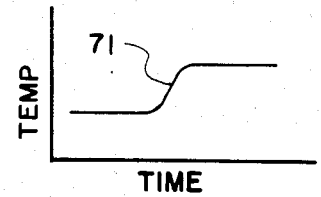

The ramprate slope 26 has been shown as a straight line curve to this point. In fact, the ramprate slope can be made up of any number of different kinds of curves. In FIGS. 7 and FIGS. 8 two modifications have been shown. In FIG. 7 a ramprate slope 70 that has a stepped configuration is shown. In FIG. 8 a ramprate slope 71 has a non-linear shape and could be exponential.

A single representative thermostate means 30 has been disclosed and is of a microcomputer based structure. Also, a single arrangement for adjusting the ramprate has also been disclosed. The present invention, however, is broad enough so as to encompass the idea of progressively adjusting the ramprate or pickup of the setpoint temperature of a thermostat in response to an overshoot or undershoot so as to be capable of implementation by various specific hardware and the use of the various types of ramprate adjusting formulas. In view of this, the applicant wishes to be limited in the scope of his invention solely by the scope of the appended claims.

The embodiments of the invention in which an exclusive property or right is claimed are defined as follows:

1. Clock thermostat means adaptively controlling the amount of overshoot or undershoot of space temperature due to changes in the current temperature setpoint of said thermostat means, including: microcomputer means including real time clock means and memory means; data input means connected to said microcomputer means to input a sequence of desired heat and cool control temperature setpoints and times for a desired temperature control by said thermostat means; temperature sensor means including connection means to monitor temperature at said thermostat means; said connection means connected to said microcomputer means to communicate a temperature at said sensor means to said microcomputer means; said thermostat means further including output switch means adapted to control heating and cooling equipment by said thermostat means; said microcomputer means and said memory means including overshoot-undershoot correction program means which is operable to adjust a ramprate slope of a current temperature setpoint of said thermostat means; said overshoot-undershoot correction program means and said memory means providing a ramprate slope that reduces an overshoot-undershoot of said space temperature due to a change in said current temperature setpoint; and said overshoot-undershoot correction program means and said memory means creating a new ramprate slope after a temperature setpoint change to progressively adjust said ramprate slope of said thermostat to limit the amount of overshoot-undershoot of said space temperature to an acceptable level.

2. Clock thermostat means as described in claim 1 wherein said real time clock means measures a finite time interval after said current temperature setpoint reaches a predetermined time to allow said overshoot-undershoot correction program means and said memory means to determine the new ramprate slope for use by said thermostat means at a next change in said temperature setpoint.

3. Clock thermostat means as described in claim 2 wherein said finite time interval is less than two hours.

4. Clock thermostat means as described in claim 2 wherein said amount of overshoot of said space temperature is limited by a subsequent ramprate slope change any time said overshoot exceeds approximately one-half of one degree Fahrenheit.

5. Clock thermostat means as described in claim 4 wherein said finite time interval is less than two hours.

6. Clock thermostat means as described in claim 5 wherein said new ramprate is equal to the prior ramprate plus a predetermined constant times a factor that is one-half of one degree Fahrenheit less a maximum temperature less a setpoint temperature.

7. Clock thermostat means as described in claim 1 wherein said ramprate slope is non-linear.

8. Clock thermostat means as described in claim 1 wherein said ramprate slope is exponential.

9. Clock thermostat means as described in claim 1 wherein said ramprate slope is a stepped curve that has an average ramprate slope.

* * * * *